No. 858,202. PATENTED JUNE 25, 1907.
R. S. McINTYRE.
AUTOMOBILE DRIVING GEAR.
APPLICATION FILED FEB. 23, 1905.
2 SHEETS—SHEET 1.
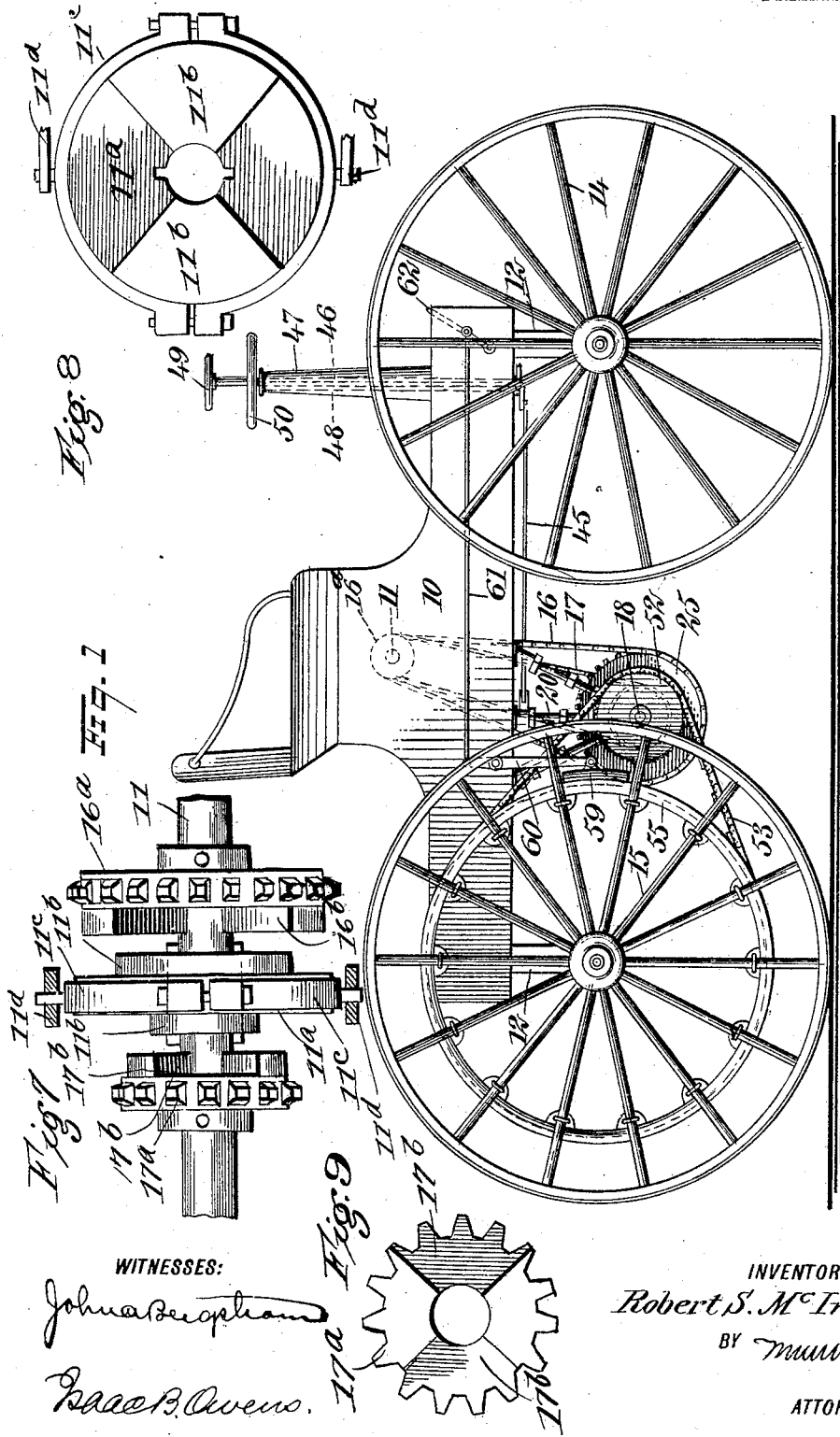
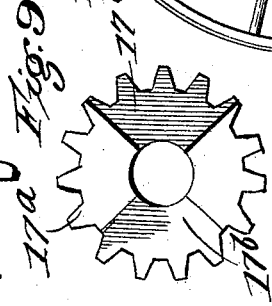
WITNESSES:
Joshua Bingham
Isaac B. Owens
INVENTOR
Robert S. McIntyre
BY Munn
ATTORNEYS

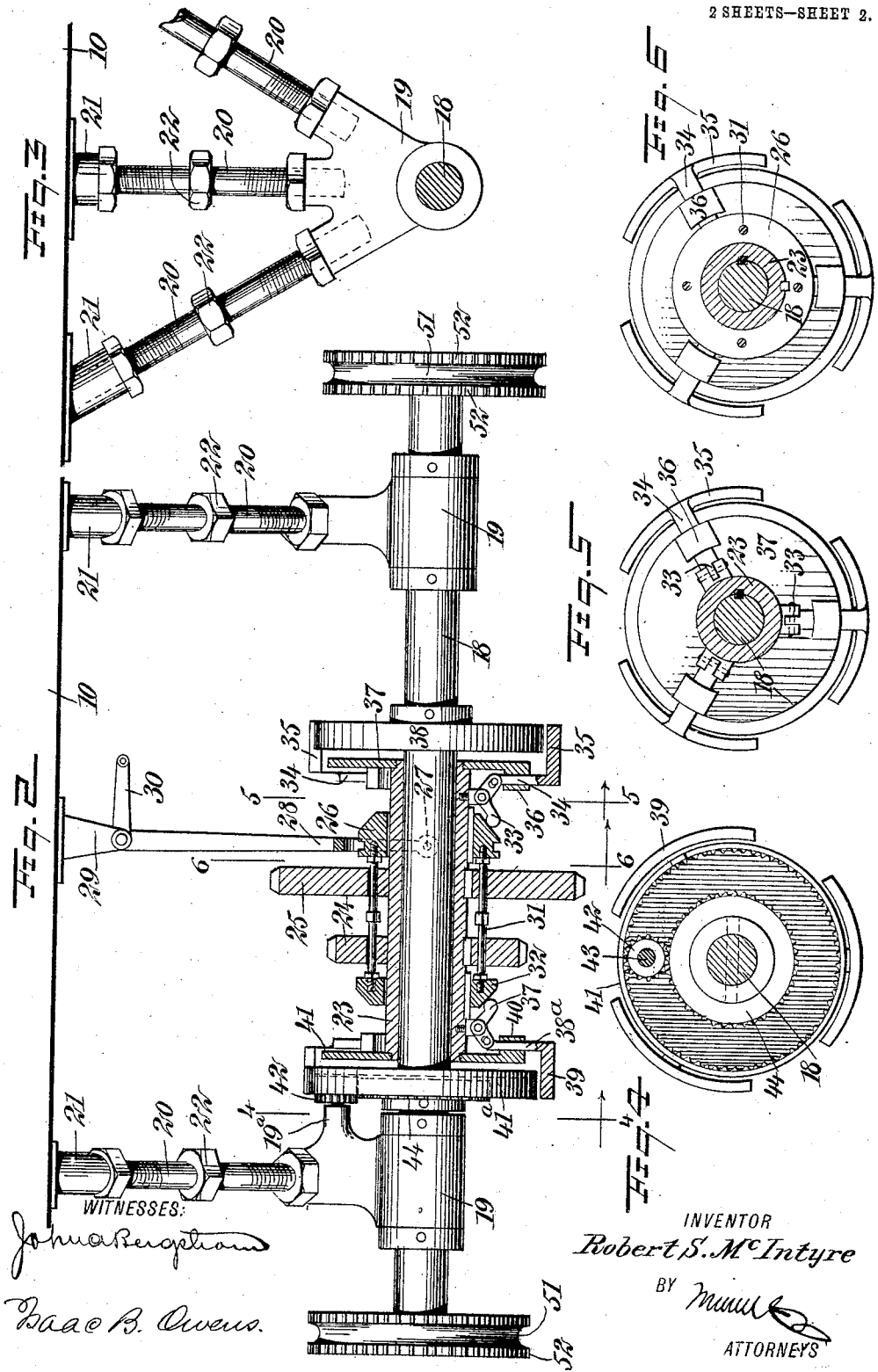

UNITED STATES PATENT OFFICE.

ROBERT SAFFORD McINTYRE, OF RIVERSIDE, CALIFORNIA.

AUTOMOBILE DRIVING-GEAR.

No. 858,202. Specification of Letters Patent. Patented June 25, 1907.

Application filed February 23, 1905. Serial No. 246,891.

*To all whom it may concern:*

Be it known that I, ROBERT SAFFORD MC-INTYRE, a citizen of the United States, and a resident of Riverside, in the county of Riverside and State of California, have invented a new and Improved Automobile Driving-Gear, of which the following is a full, clear, and exact description.

My invention relates particularly though not necessarily, to a means for driving motor vehicles, in which a countershaft is employed, connected with the engine or motor by certain means for driving the shaft and for changing the direction of revolution, and connected with the rear or other traction wheels of the vehicle by means of chains running over sprockets on the countershaft and other sprockets connected with said traction wheels.

The invention involves various other features of major or minor importance, all of which will be fully set forth hereinafter and pointed out in the claims.

Reference will now be had to the accompanying drawings illustrating as an example the preferred embodiment of my invention, in which drawings like characters of reference indicate like parts in the several views, and in which Figure 1 is a side elevation of a motor vehicle equipped with my improvements; Fig. 2 is a side elevation of the countershaft and the supporting hangers with parts on the shaft in section; Fig. 3 is a view showing the countershaft in section and illustrating one of the peculiar hangers for the shaft; Fig. 4 is a sectional view on the line 4—4 of Fig. 2; Fig. 5 is a sectional view on the line 5—5 of Fig. 2; Fig. 6 is a sectional view on the line 6—6 of Fig. 2; Fig. 7 is a side view of the clutch mechanism on the motor shaft; Fig. 8 is a side view of the clutch collar, and Fig. 9 is an inner face view of one of the sprocket wheels.

Referring particularly to Fig. 1, the body 10 of the vehicle is supposed to carry the motor, the shaft of which is indicated by the broken lines 11 in said figure. Said body is supported by springs or other means 12 on the front and rear axles which carry the front wheels 14 and rear wheels 15, as shown. These wheels, according to the preferred embodiment of my invention, are provided with flat tires and do not necessitate the use of the rubber tires now commonly employed.

The shaft 11 is provided with sprocket wheels $16^a$ and $17^a$ loosely mounted thereon and the inner faces of the sprocket wheels are provided with V-shaped recesses $16^b$ and $17^b$ adapted to be alternately engaged by correspondingly shaped projections $11^b$ on the opposing faces of a collar $11^a$ mounted to slide on the shaft 11 but to turn therewith. On the collar $11^a$ is a band $11^c$ with which an operating lever $11^d$ engages and by means of which the collar can be slid upon the shaft to cause its projections to enter the recesses of either of the sprocket wheels to lock the same to the shaft. Sprocket chains 16 and 17 pass around the sprocket wheels $16^a$ and $17^a$ and also around sprocket wheels carried by a counter shaft 18, as hereinafter described. This counter shaft is revolubly mounted in boxes 19 which are sustained by threaded hanger rods 20. Preferably, three rods 20 are applied to each box 19, and these rods are screwed into the boxes and into suitable socket nuts 21 attached to the body 10 of the vehicle, or to any other desired or convenient part. The threaded rods 20 are provided with hexagonal portions 22 for the application of a wrench by which the boxes may be adjusted so as to hold the boxes in any desired position. Fitted loosely on the shaft 18 at any convenient point thereon between the boxes 19 is a sleeve 23, to which two sprocket or other gears 24 and 25 are fastened. These gears are located intermediate the ends of the sleeve and are respectively engaged by the sprocket chains 17 and 16, so that the sleeve 23 is revolubly driven from one or the other of said chains according to which is in motion derived from the engine shaft 11.

26 indicates a collar which is splined on the sleeve 23, and which is provided with a beveled outer face and with an annular groove. The annular groove is adapted to receive the pins 27 of a forked arm 28. Said arm is pivotally mounted on the body 10 by a bracket 29 or equivalent means, and is connected with an arm 30, which facilitates the operation of the arm 28, so as to slide the collar 26 on the sleeve 23, said collar rotating continuously with the sleeve and the shaft 18. Connected to the collar 26 are rods 31 which slide loosely through the sprocket wheels 24 and 25 parallel with the shaft 18 and sleeve 23, and which are fastened to a collar 32 having a beveled outer face similar to the beveled face on the collar 26. The beveled face of the collar 26 coacts with elbow levers 33 which are joined to radial rods 34 carrying clutch shoes 35 at their outer ends. Said rods slide freely in bearings 36 secured to or formed integral with a disk 37 which is fastened to one end of the shaft 18. The clutch shoes 35 coact with the periphery of a clutch disk 38, fastened securely to the shaft 18. The beveled face of the collar 32 coacts with elbow levers 37, fulcrumed on the sleeve 23 and articulated to radial rods 38$^a$ carrying clutch shoes 39 at their outer ends. The rods 38$^a$ slide in bearings 40 carried by a disk 41, fastened to the end of the sleeve 23 opposite the end bearing the disk 38. The clutch shoes 39 coact with the smooth periphery of an internal gear 41$^a$. This gear 41$^a$ is loosely mounted on the shaft 18 and it is in mesh with an intermediate pinion 42, carried loosely on a stud shaft 43 mounted in an extension 19$^a$ of the adjacent box 19. The pinion 42 also engages a spur gear 44 fastened to the shaft 18. The sleeve 23 rotates continuously in one direction under the action of the movement imparted thereto through either the sprocket 24 or sprocket 25. Throwing the lever 28 rightward (referring to Fig. 2) the collar 26 will be caused to move inward the shoes 35 and engage the same with the disk 38 so as to drive the shaft 18 in the direction corresponding to that in which the sleeve 23 is rotating, the speed of the shaft being the same as that of the sleeve. By reversing the movement of the lever 28 the collar 26 is disengaged from the lever 33 and the collar 32 acts on the levers 37 to fasten the internal gear 41$^a$ so that it turns with the sleeve 23 and by the action of the intermediate gear 42 and spur gear 44 the shaft 18 is rotated reversely with respect to the direction of rotation of the sleeve and at a slower speed. The movement first described is that intended to drive the vehicle ahead, and the second described movement is intended to drive the vehicle rearward. The arm 30 connected with the lever 28, may be actuated by any desired means. As shown in Fig. 1, I prefer to provide a connection 45 extending from said arm to a shaft 46 which passes loosely through a column 47 carrying the hollow steering shaft 48. 49 indicates a hand wheel for operating the shaft 46, and 50 indicates the steering wheel which operates the shaft 48.

At each end the shaft 18 carries a gear wheel, the periphery of which is formed with a groove 51, at each side of which groove is arranged a row of teeth 52. These gear wheels are adapted to carry a traction chain 53. Said chain passes around driving sprockets 55 attached to the rear or traction wheels 15 of the vehicle.

59 indicates a brake shoe which bears against the sprocket 55, and which is connected to a lever 60 operated by a link 61 and foot lever 62, as shown in Fig. 1. This shoe 59 bears on the sprocket 55 between the runs of the chain, the chain and brake shoe operating on the sprocket simultaneously but independently of each other. If desired, a brake shoe may be provided at each side of the vehicle.

In the operation of the apparatus, the shaft 11 is driven from the engine and the chains 16 and 17 are driven from said shaft through the medium of any desired gearing for throwing one or the other chain into action, as desired, and for driving the same at any desired speed. In this manner the sleeve 23 is continuously rotated in one direction and at a speed which may be varied at will. By throwing the collar 26 into action, the countershaft 18 and consequently the traction wheels of the vehicle may be rotated to drive the vehicle ahead, and by throwing the collar 32 into action this movement may be reversed, thus reversing the direction of the movement of the vehicle. Transmission in either direction may be arrested by throwing the collars 32 and 26 into intermediate positions, such as shown, for example, in Fig. 2 of the drawings, so that the sleeve 23 rotates freely on the shaft 18 without imparting movement thereto.

My invention further provides for imparting to the sleeve continuous movement in one direction at any desired speed, and for driving the countershaft 18 and the traction wheels of the vehicle from this sleeve either forward or backward, or for arresting all movement of the countershaft, according to the desire of the driver of the vehicle. These operations taking place between the sleeve and countershaft, are controlled entirely by the forked lever 38 and its connections. The brake may be operated at will by pressing on the treadle 62.

Having thus described the preferred form of my invention, what I claim as new and desire to secure by Letters Patent is:

1. The combination with a support of a revolubly driven sleeve, a countershaft on which the sleeve is loosely carried, a clutch member fastened to the shaft at one end of the sleeve, an internal gear clutch member loose on the shaft at the other end of the sleeve, a gearing connecting said internal gear, clutch member with the shaft to drive the shaft reversely with respect to the direction of rotation of the clutch member, clutch members carried by the sleeve and coacting respectively with the first named clutch members, means for alternately throwing the last named members into action, a driven element and means for connecting the shaft with said element.

2. The combination with a support of a revolubly driven sleeve, a revoluble countershaft on which the sleeve is loosely mounted, a clutch member fastened to the shaft at one end of the sleeve, a clutch member carried by said end of the sleeve and coacting with the first named clutch member, a collar sliding on the sleeve and adapted to actuate the clutch member of the sleeve, means for operating the collar, a second collar connected to the first collar to move in unison therewith, a third clutch member loosely mounted on the countershaft, means connecting the third clutch member with the countershaft to drive the shaft reversely with respect to the direction of rotation of said clutch member, a fourth clutch member carried on the sleeve, means for operating the fourth clutch member from the second named collar, a driven element, and means connecting the driving element with said driven element.

3. In a motor vehicle, the combination with a source of power, of a counter-shaft revolubly mounted on the vehicle, a sleeve loosely mounted on the counter-shaft, means for driving the sleeve at varying speed from the source of power, means for driving the counter-shaft from the sleeve in either direction, and devices adapted to connect the counter-shaft with the traction wheels of the vehicle.

4. The combination with a support, of a shaft, a sleeve loosely mounted thereon, means for driving the sleeve at varying speed, and means for driving the shaft from the sleeve in either direction.

5. The combination with a support, of a shaft, a sleeve loosely mounted thereon, means for driving the sleeve at varying speed, said means including gears of different diameter secured to the sleeve, and means for driving the shaft from the sleeve in either direction.

6. The combination with a support, of a rotary shaft mounted therein, a sleeve loose on the shaft, means for revolubly driving the sleeve, a clutch for directly connecting the sleeve and shaft to drive the latter from the former, an internal gear loose on the shaft, a clutch for connecting said gear with the sleeve, an intermediate gear meshed with the internal gear, and a third gear meshed with the intermediate gear and fixed to the shaft.

In testimony whereof I have signed my name to this specification in the presence of two subscribing witnesses.

ROBERT SAFFORD McINTYRE.

Witnesses:
CHARLES E. IVES,
ROSE L. RICHEY.